United States Patent
Lee et al.

(10) Patent No.: US 8,610,668 B2
(45) Date of Patent: Dec. 17, 2013

(54) COMPUTER KEYBOARD WITH INPUT DEVICE

(75) Inventors: Sai Mun Lee, Penang (MY); Yik Leong Chong, Penang (MY)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 560 days.

(21) Appl. No.: 12/895,044

(22) Filed: Sep. 30, 2010

(65) Prior Publication Data

US 2012/0081283 A1   Apr. 5, 2012

(51) Int. Cl.
*G09G 5/00* (2006.01)

(52) U.S. Cl.
USPC .................................. 345/168; 178/18.09

(58) Field of Classification Search
USPC .......... 345/157, 168, 175; 178/18.09; 341/22, 341/31; 361/679.1
See application file for complete search history.

(56) References Cited

U.S. PATENT DOCUMENTS

| | | | | |
|---|---|---|---|---|
| 4,386,346 A | * | 5/1983 | Levine ........................... | 345/159 |
| 4,931,781 A | * | 6/1990 | Miyakawa .................... | 345/160 |
| 5,231,380 A | * | 7/1993 | Logan .......................... | 345/156 |
| 5,245,321 A | * | 9/1993 | Franz et al. ................... | 345/172 |
| 7,414,548 B2 | * | 8/2008 | Volckers ........................ | 341/22 |
| 7,586,480 B2 | * | 9/2009 | Sachs et al. ................... | 345/157 |
| 7,728,812 B2 | * | 6/2010 | Sato et al. .................... | 345/156 |
| 2004/0041791 A1 | | 3/2004 | Dunker | |
| 2005/0174457 A1 | * | 8/2005 | Yoshino et al. .......... | 348/333.01 |
| 2007/0132873 A1 | * | 6/2007 | Hyodo ..................... | 348/333.01 |
| 2009/0256802 A1 | | 10/2009 | Lou et al. | |
| 2010/0026626 A1 | | 2/2010 | Macfarland | |
| 2010/0171694 A1 | * | 7/2010 | Lu et al. ........................ | 345/157 |
| 2010/0265179 A1 | * | 10/2010 | Ram ............................. | 345/163 |
| 2010/0302208 A1 | * | 12/2010 | Brosnan et al. ............... | 345/175 |
| 2011/0006991 A1 | * | 1/2011 | Elias ............................. | 345/168 |
| 2012/0044146 A1 | * | 2/2012 | Stewart et al. ................ | 345/168 |

FOREIGN PATENT DOCUMENTS

| | | |
|---|---|---|
| CN | 2938210 | 8/2007 |
| EP | 0923020 | 6/1999 |

* cited by examiner

*Primary Examiner* — Tom Sheng

(57) ABSTRACT

A computer keyboard integrated with an optical input device is provided. The computer keyboard includes a plurality of keys, a plurality of optical input devices, a controller, and a navigation engine configured to generate an input function in response to finger movement on one or more of the plurality of input devices. The computer keyboard controller is configured to permit the user to assign an input function to one or more of the plurality of optical input devices from a list of input functions. The plurality of optical input devices have firmware capable of stitching two input devices together to provide a combined input function.

20 Claims, 7 Drawing Sheets

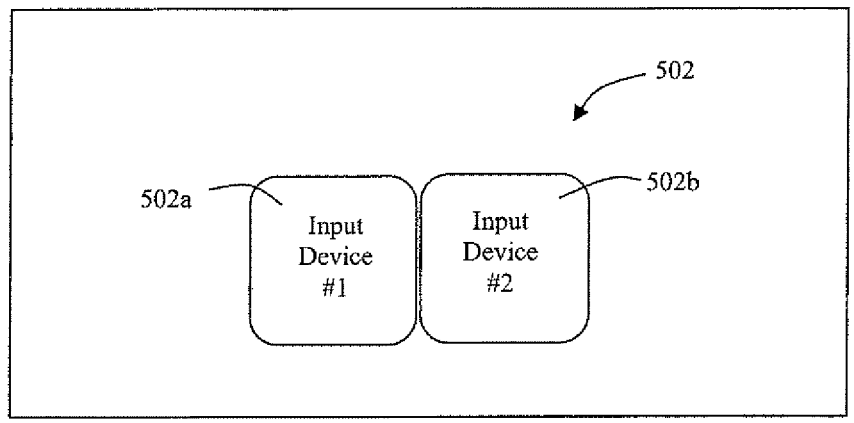
FIG. 5a
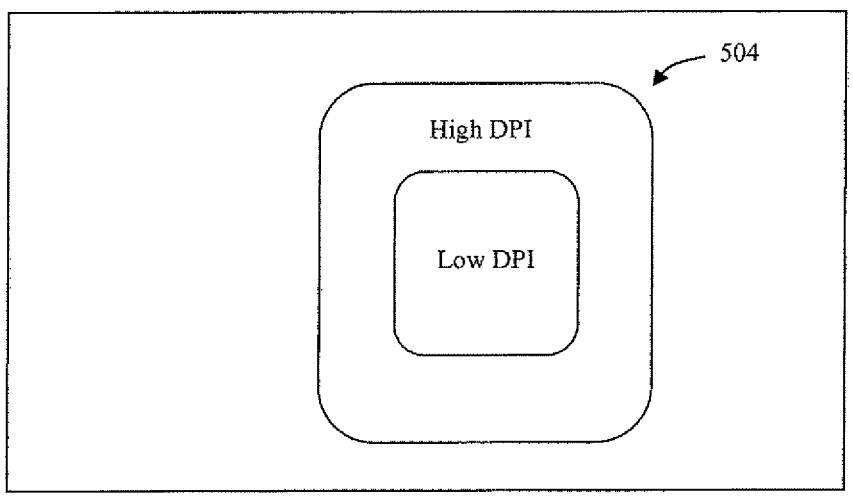
FIG. 5b
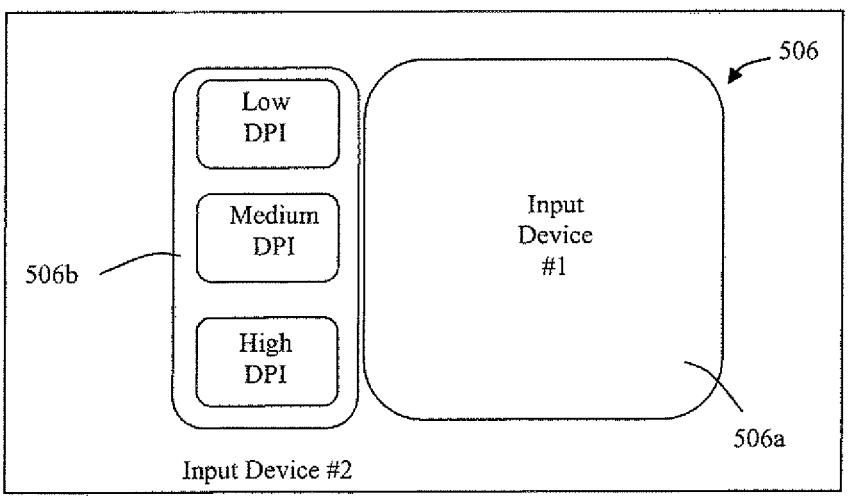
FIG. 5c
FIG. 5

COMPUTER KEYBOARD WITH INPUT DEVICE

BACKGROUND

The use of a keyboard to control a computer, laptop, or other similar electronic device and a mouse as an input device for cursor navigation on a screen are well-known in the art. A typical computer system uses a keyboard for text input and a separate input device, such as a mouse to provide an input mechanism to control a cursor on the computer's screen. In addition to taking up valuable desk space by having two separate devices, e.g., mouse and keyboard, it is inconvenient and time consuming to move one's hand to and from the keyboard and the mouse unit when shifting back and forth between typing and cursor controls.

A combination keyboard and cursor control input device has been introduced. Generally, a combined keyboard with mouse functionality device has additional navigation input keys or mouse components arranged on the existing keyboard to emulate the mouse input mechanisms. Other existing keyboards with integrated mouse type input functionality may have a design which deviates from the traditional "QWERTY" keyboard arrangement. Hence, using such a device would require the user to learn a new typing method instead of the conventional method in which both hands are placed on the home positions, known as the traditional blind touch method.

More recently, manufacturers have combined a wide variety of input devices with the conventional keyboard, in order to provide addition input functions to the keyboard, including: track balls, scrollers, track pads, joy sticks, optical puck, and so on. While the combination of the two systems may be convenient, such devices may not provide a satisfactory cursor navigating function as expected from a conventional mouse. Rather, it may lack the user-friendly operation of the blind "QWERTY" touch typing method. Specifically, for most of these combination keyboards, the user must move their hands from the "QWERTY" resting position, in order to utilize the additional input device, which is inconvenient and slows down the typing process. Additionally, the combination of a touch pad onto a keyboard is more likely prone to accidental touch of the thumb or palm on the sensitive touch pad due to the layout of the keyboard and the touch pad. Thus, resulting in unintentional click or cursor movement during the text input process, which may result in various typing and input errors. In addition, typical touch devices generally only offer low pointing resolution capability. Therefore, it may not be suitable for gaming purposes, which normally requires a high performance input functionality.

In another conventional keyboard having an integrated mouse functionality, the keyboard may deploy a conventional optical navigation system having a puck or a sliding pad for providing the cursor navigation functions. However, due to the large size of such a module, the complexity in its structure and lack of product robustness, such a system would not provide a particularly smaller system than a separate mouse device, may not be reliable, and may be more susceptible to mechanical failure or compromises to its navigation performance.

BRIEF DESCRIPTION OF THE DRAWINGS

Throughout the description and figures, similar reference numbers may be used to identify similar elements.

FIG. 5 illustrates a schematic block diagram of a computer keyboard with a different arrangement of an integral input device.

DETAILED DESCRIPTION

Figure 1:
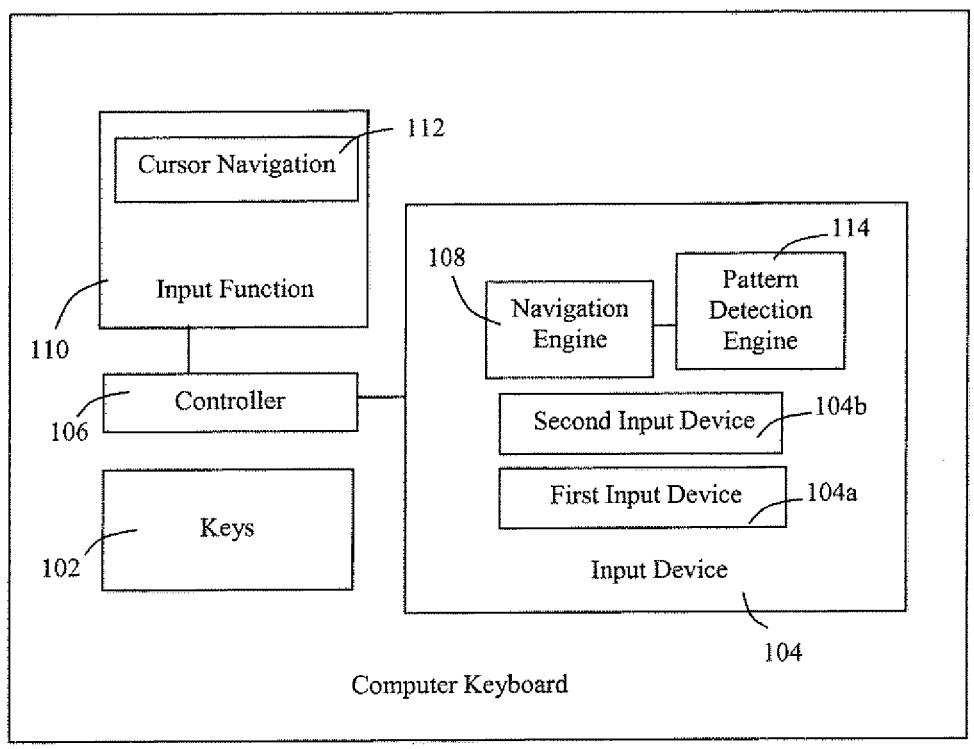
FIG. 1 illustrates a block diagram of a computer keyboard with an integral input device.

FIG. 1 illustrates a schematic block diagram of one embodiment of a computer keyboard 100 integrated with optical input devices 104 for providing input functions 110. The computer keyboard 100 may include a plurality of keys 102, at least one optical input device 104, a controller 106, a navigation engine 108, and a pattern detection engine 114. In one embodiment, the computer keyboard 100 may include a plurality of keys 102 capable of being depressed for generating a character or a sign, for allowing computer programming and text input. The computer keyboard 100 may have a standard keyboard mode whereby the keys on the keyboard are arranged in the conventional "QWERTY" manner.

Although certain components or elements are illustrated in conjunction with the computer keyboard 100 with integral optical input devices 104 in FIG. 1, other embodiments may implement fewer or more components, or have similar components that are capable of providing similar or even more complex computer keyboard and input functions. For example, some embodiments of computer keyboard 100 having integral input device 104 may include a computer processor (not shown) embedded therein, together with an operating system (not shown) to provide computer processing power which may function equivalent to a portable computer. Moreover, some embodiments of the computer keyboard 100 with integral input device 104 may not follow conventional typing keys arrangement instead adopting a typing method different from the standard flat keyboard known as the "QWERTY" keyboard.

Figure 2:
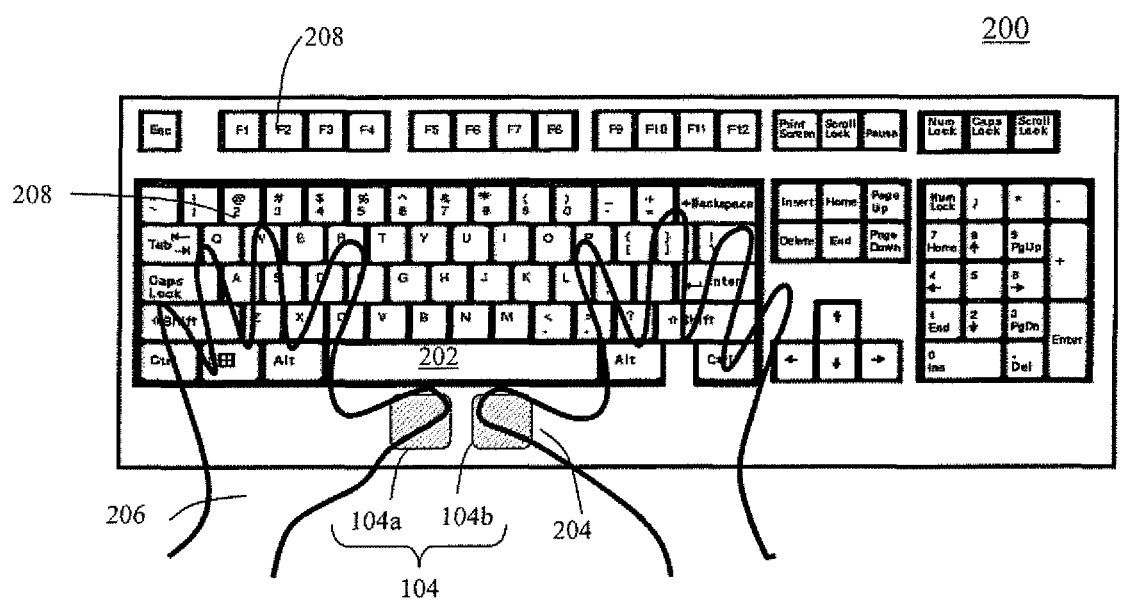
FIG. 2 illustrates a schematic block diagram of a computer keyboard with an integral input device.

FIG. 2 illustrates a schematic block diagram of one embodiment of a computer keyboard 200 with input device. The computer keyboard 200 may include at least one input device 104 configured to generate the input function 110 in response to finger movement on the input device 104. As illustrated in FIG. 2, the computer keyboard 200 may include two optical input devices 104a and 104b. The input devices 104a and 104b may be located substantially adjacent to the space bar 202 on a keyboard 200 in a location accessible by a user's thumbs 204 when the user's hands 206 are placed on the computer keyboard 200 in a typical "QWERTY" typing position. In this way, the computer keyboard 200 with an integral input device eliminates the inconvenient and time consuming movement of the user's hands 206 back and forth between the keyboard (not shown) and a typical external mouse device (not shown), in order to operate both a keyboard for typing and a mouse for cursor control. In one embodiment, the computer keyboard 200 permits the simultaneous entry of text and manipulation of navigation functions without requiring the user to lift their hands 206 from the keys 208 on the keyboard 200.

Traditional separate keyboards (not shown) and external mouse (not shown) arrangements usually require at least two USB ports to be utilized continually. The computer keyboard 200 with integral input device 104 eliminates the use of a USB port, while both functions are simultaneously available. In addition to saving cost and valuable desk space by having one device instead of two, the computer keyboard 200 with input device 104 may also provide ergonomic advantages. It may eliminate the repetitive movements of one hand traveling back and forth between the keyboard for typing and the mouse (not shown) for cursor navigation.

In one embodiment, as illustrated in FIG. 1, the computer keyboard 100 with input function may include at least one input device 104 configured to provide at least one input function 110. The computer keyboard 100 may have a first input device 104a to provide a first input function and a second input device 104b to provide a second input function, whereby the first input device 104a and the second input devices 104b may be configured to perform input function 110 independently or both devices can be combined to provide a single input function, cooperative input functions, or multiple input functions. In one embodiment, two or more of the input devices 104a and 104b may be stitched together with firmware to provide a single input function 110. For example, input devices 104a and 104b may be stitched together to provide a cursor navigation 112 over a large area of a large monitor display. Therefore, by placing two input devices 104a and 104b in close proximity with each other, and stitching the two devices together with firmware, a user may be able to navigate the cursor (not shown) over a large screen display (not shown) with a single swipe of a finger or thumb, rather than with multiple swipes, which is typically required to navigate a cursor across a large monitor by traditional small optical finger navigation devices.

As illustrated in FIG. 1, in one embodiment the optical input device may include a pattern detection engine 114 coupled to a navigation engine 108 configured to recognize a pattern, gesture, or a sequence of movements made by a thumb, finger, or combination thereof at, near, or on the surface of the input device 104. The pattern or the gesture generated by the thumb or finger may be used to emulate various navigation functions, such as a 360 degree cursor navigation, scroll and zooming action, or mouse click event. For example, the 360 degree cursor navigation may be emulated by swiping a thumb or finger in any direction on the surface of the input device 104. In another example, the left click or a right click mouse function may be emulated by a defined set of tapping sequences or a pattern of finger movements at the surface of the input device 104. For example, the left click can be emulated by a quick tap, whereas the right click function can be emulated by a finger tap and hold without a motion for a period, a quick double tap, or other similar pattern of movement(s). Likewise, a left click may involve a tap on the first input device 104a, while a right click may involve a tap on the second input device 104b, or some similar combination or pattern of movements. Further embodiments for different combinations of the input devices on the keyboard with its advantages are shown in more detail with reference FIGS. 5a-5c.

Figure 3:
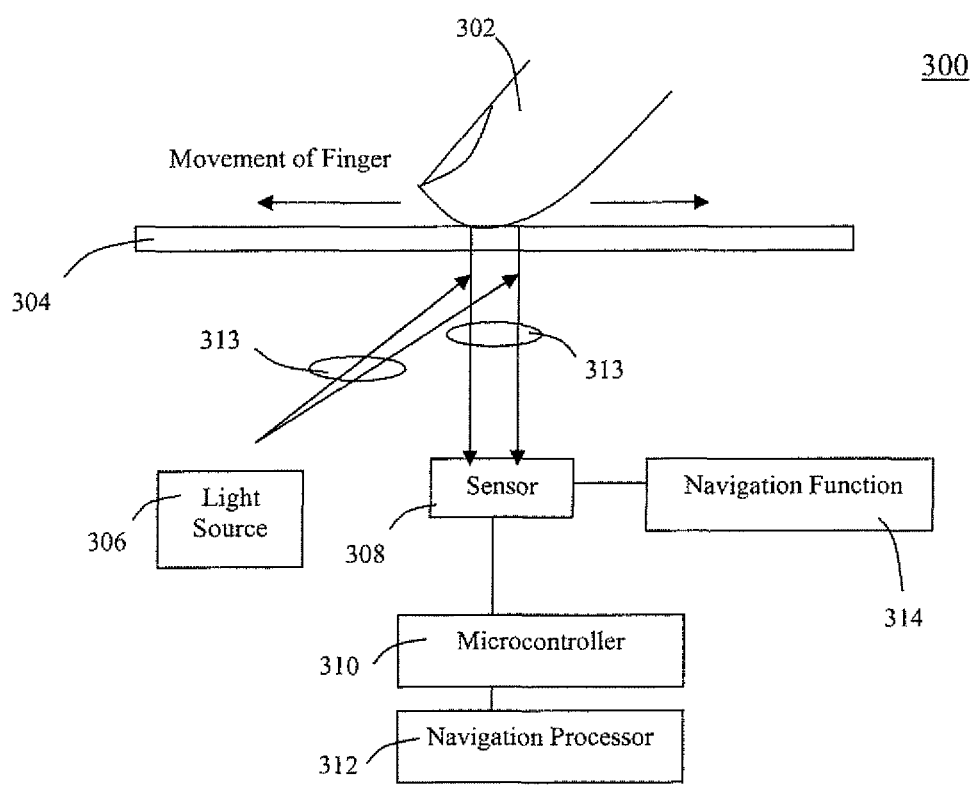
FIG. 3 illustrates a schematic block diagram of an optical input device.

FIG. 3 illustrates a schematic block diagram of one embodiment of an optical input device 300. In one embodiment, the optical input device 300 may be configured to detect the movement of the finger 302 on the surface 304 of the input device 300 to generate navigation function 314. For example, for cursor navigation, the optical input device 300 may track the relative movement of the finger 302 over the surface 304 of the optical input device 300 and translate the finger 302 movement into cursor movement on a computer (not shown). The optical input device 300 may include a light source 306 to illuminate the finger 302 and an image sensor 308 to capture frames of the reflected finger image. The optical input device 300 may compare successive image frames captured and determine the relative motion between the finger 302 and the surface 304 in terms of movement vectors in the directional delta X and delta Y, corresponding to the movement of the finger 302 relative to the surface 304. The optical input device 300 may subsequently process and further translate the motion data into a corresponding cursor movement on a computer monitor (not shown). It should be noted that the input device 300 may include other essential components such as a microcontroller 310, a navigation processor 312, and one or more lenses 313, which are generally found in a typical input device to enable the navigation operation, however for simplicity reason, the functions of these respective components will not be elaborated further.

Figure 4:
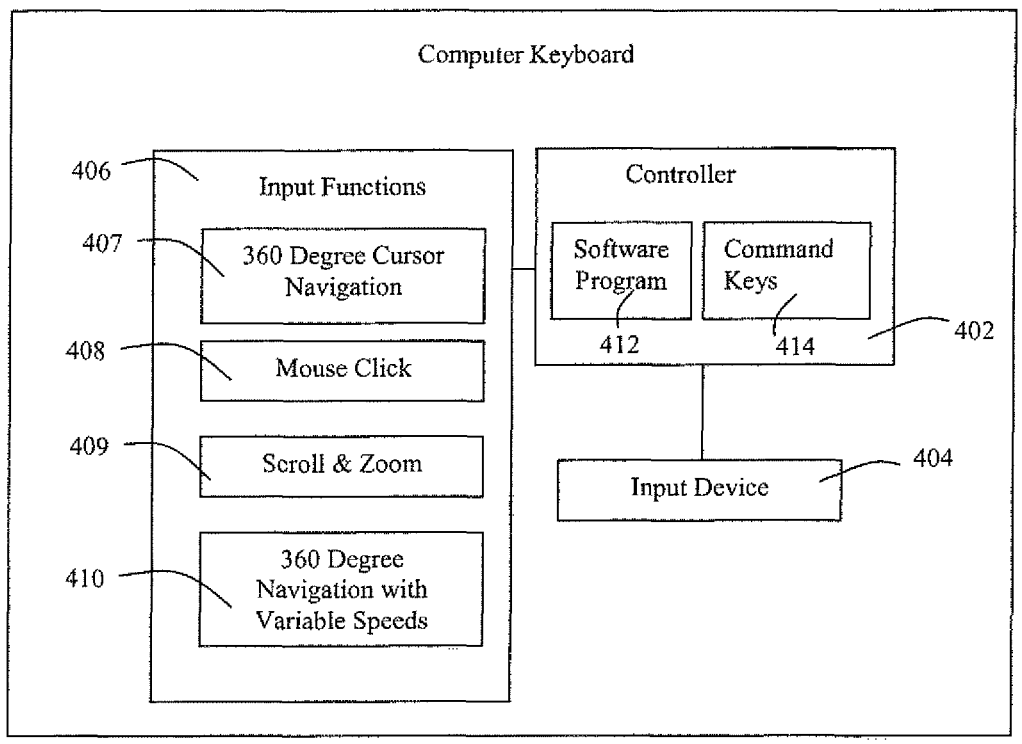
FIG. 4 illustrates another block diagram of a computer keyboard with an integral input device.

FIG. 4 illustrates another block diagram of a computer keyboard 400 with an input device 404. In one embodiment, the computer keyboard 400 with input functions may include a controller 402 coupled to the input device 404. The controller 402 may permit the user to assign an input function to the input device 404 from a list of input functions 406. For example, the controller 402 may display a list of input functions 406 which may include of a 360 degree cursor navigation 407, a left-right clicking function 408, similar to a mouse dual click function, a scroll, a zooming 409 function of a mouse, and a 360 degree cursor navigation with variable cursor speeds 410. In one embodiment, the controller 402 may permit the user to select and subsequently assign any of the input functions 406 from among the list of input functions to any of the input devices 404, as desired. The controller 402 may further include firmware which may store data and instructions for implementing the various operations of the input function 406. For example, the controller 402 may be represented in the form of a software program 412 coupled to a computer system (not shown), whereby the input functions 406 selection may be presented as a program menu. The program menu may list all the available input functions 406 on the computer screen (not shown) for the user to select. In another embodiment, the controller 402 may be represented in the form of a plurality of preprogrammed command keys 414, whereby each command key 414 has been preprogrammed with a specific executable command. For example, the computer keyboard 400 may include a first key which may be marked as "select" and preprogrammed with an executable instruction for assigning an input function to one of the input device; a second key which may be marked as "360 degree cursor navigation" and preprogrammed with a 360 degree cursor navigation function working instructions; and a third key which may be marked as "first input device" and preprogrammed to switch on the first input device. Therefore, in order to assign a 360 degree cursor navigation function 407 to the first input device on the keyboard, the user may only need to press the "select" key follow by the "360 degree cursor navigation" key and subsequently the "first input device" key to accomplish the task. Likewise, other input function can also be assigned to any of the input device in the same way.

FIG. 5 illustrates a schematic block diagram of different arrangements of optical input devices 502, 504 and 506 for a keyboard. In one embodiment, the keyboard may provide at least one input device configured to provide the input functions independently. In another embodiment, two or more input devices 502a and 502b may be stitched together to provide a single input function or more than one input functions. As shown in FIG. 5a, two input devices may be stitch together with firmware having a stitching algorithm to allow a user to navigate the cursor over a large monitor display with a single finger swipe, rather than multiple swipes over an input device. For example, the stitching algorithm may instruct a navigation engine to read the finger movement over the two input devices 502a and 502b as a single continuous motion. The algorithm may overwrite any disconnecting portion(s) between the two input devices 502a and 502b, and stitch them together to generate a cursor with a greater travel distance than the typical cursor in response to a single finger swipe over a single input device.

As shown in FIG. 5b, in another embodiment, the keyboard may include a cursor speed switch 504 for allowing the cursor to move at different or variable speeds. The cursor speed switch 504 may provide a cursor switch with different resolution zones. For example, the switch may have an inner zone with a low dpi setting and an outer zone with a higher dpi setting. In general, the dpi (dots per inch) is a setting which determines the sensitivity of the input device in correspondence to the speed of the cursor movement per inch of the finger motion. Accordingly, if the user swipes a finger over the outer region, this will make the cursor move with a larger displacement, that is, more quickly.

In general, the sensitivity of the motion of the cursor can be controlled through signal processing or similar software related controls. The ability to adjust the sensitivity of the cursor movement allows the user to experience a more enjoyable user interface. In some settings it may be desirable to have a very sensitive cursor-control routine by moving the finger over an input device, for example in a map software or picture editing software, it is essential to have a very fine adjustment within the viewing area. The cursor speed switch 504 may be utilized to control the cursor to move at a desired rate which can include pixel-by-pixel motion. This fine-tuned cursor speed control may also be desirable in a gaming environment.

In another embodiment illustrated in FIG. 5c, the cursor speed switch 506 may include a cursor resolution selection area assigned to a first input device 506a while a second input device 506b may be used for operating the cursor navigation.

In another embodiment as illustrated in FIG. 5c, the cursor speed switch 506 may include multiple levels of sensitivity settings having several predefined speeds. The cursor speed may be adjusted by selecting one of the settings. For example, the level of sensitivity for using graphic or picture feature in a program can be set to high, while the sensitivity for the home navigation-screen can be set to low, and the sensitivity for games can be set to medium. Alternatively, various finger gestures in the speed switch 506 may be utilized to control the cursor speed. For example, a single finger tap in speed switch 506 selects a low speed, two quick taps selects a medium speed, and 3 quick taps selects a high cursor speed, etc. In another alternative, swiping the finger in an upward movement in the cursor speed switching area 506 may increase the cursor speed, while swiping the finger in a downward movement in the cursor speed switching area 506 may decrease the cursor speed. Such actions may be made more than once. For example, a second upward movement increases the cursor speed again, and vice verse.

Figure 6:
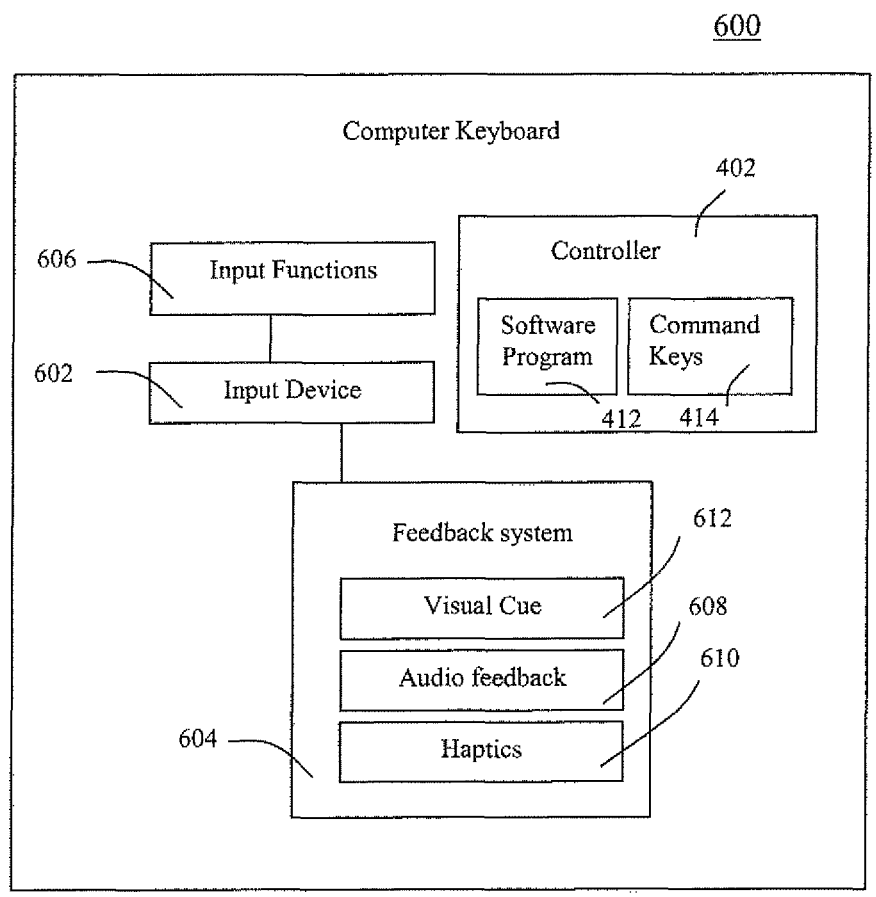
FIG. 6 illustrates a schematic block diagram of a computer keyboard with an integral input device having a feedback system.

FIG. 6 illustrates a schematic block diagram of keyboard 600 with an input device having a feedback system. In one embodiment, the computer keyboard 600 may include an input device 602 coupled with a feedback system 604 configured to provide feedback to the user to positively confirm the actual activation of one of the input functions 606. The feedback system may include an audio feedback system 608; a haptics vibrating mechanism 610 or a visual cue 612 feedback system displayed on the computer screen (not shown), to provide feedback when a user operates one of the input devices 602. For example, visual cues 612 on a computer screen may assist the user regarding where to place and how to slide their finger on the input device 602. Additionally, the visual cue 612 may also illustrate a moving line or lines which may show the user the desired swiping speed and direction. Such cues can increase the likelihood of successful swipes, thus, reducing user frustration. The feedback system may be turned on and off or only pop-up when a user is not using the input system properly or optimally, similar to pop-up user help menus in various computer software programs.

Figure 7:
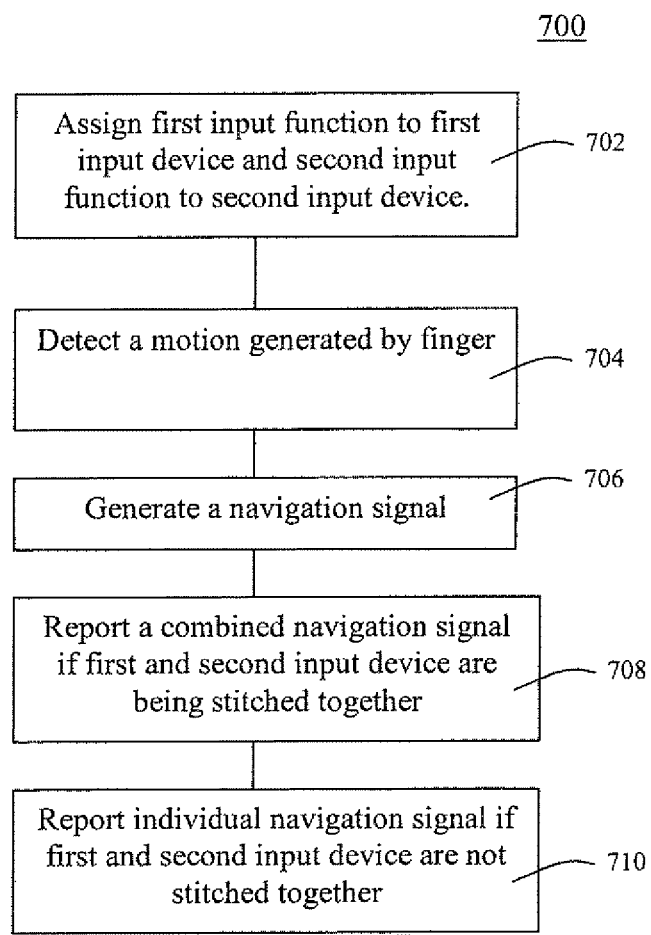
FIG. 7 illustrates a flow chart of a method of a navigation operation of a keyboard integrated with an integral optical input device

FIG. 7 illustrates a flow chart illustrating a method of navigation operation 700 of the keyboard integrated with optical input device, as described with respect to FIGS. 1-6 above. At block 702, the controller assigns a first input function to the first input device and a second input function to the second input device. In one embodiment, the controller may provide a list of input functions to the user and permit the user to select a function to assign to each input device. The controller subsequently may assign the selected input functions to the respective input devices. At block 704, the input device detects a motion generated by a thumb or finger on the surface of the input device. In one embodiment, the input device may detect an input gesture pattern generated by the finger and than matches the pattern to a predetermined input gesture pattern. At block 706, the input device generates a navigation signal in response to a finger motion or pattern detected by the optical input device. At block 708, the navigation engine reports a combined navigation signal if first and second input devices are stitched together. At block 710, the navigation engine reports individual navigation signals from respective input devices if the first and second input devices are not stitched together.

Although the operations of the methods herein are shown and described in a particular order, it will be understood by those skilled in the art, that the order of each method may be altered, for example, so that certain operations may be performed in a different, in an inverse order, or so that certain operations may be performed, at least in part, concurrently with other operations.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:
1. A computer keyboard, comprising:
 a plurality of keys configured to be depressed for generating a character or a sign;
 a first optical input device configured to provide a first navigation signal in response to finger movement on the first optical input device;
 a second optical input device configured to provide a second navigation signal in response to finger movement on the second optical input device;
 a controller configured to assign input functions to the first optical input device and the second optical input device; and
 a navigation engine coupled to the first and second optical input devices, the navigation engine configured to report,
 individual navigation signals when the first and second optical input devices are independent or a combined navigation signal when the first and second optical input devices are stitched together.

2. The computer keyboard of claim 1 wherein the first and second optical input devices are located substantially adjacent to a space bar on the keyboard in a location accessible by a user's thumb when the user's hands are on the keyboard in a normal typing position.

3. The computer keyboard of claim 2, wherein the first and second optical input devices are configured to be operable by a user's thumbs while the user's hands are placed on the keyboard during typing.

4. The computer keyboard of claim 1, wherein the first and second optical input devices further comprise a navigation sensor operable to detect finger movement.

5. The computer keyboard of claim 4, wherein the navigation sensor coupled to a pattern detection engine configured to read pattern generated by finger movement, wherein the pattern generated by finger movement is assigned to a predetermined input function.

6. The computer keyboard of claim 5, wherein the predetermined input function is a 360 degree cursor navigation.

7. The computer keyboard of claim 5, wherein the predetermined input function is a left-right clicking action of a mouse.

8. The computer keyboard of claim 5, wherein the predetermined input function is a scroll and zooming action of a mouse.

9. The computer keyboard of claim 5, wherein the predetermined input function is a cursor speed switch for controlling cursor movement speed.

10. The computer keyboard of claim 9, wherein the cursor speed switch is coupled with 360 degree cursor navigation, permitting cursor movement at various speeds and directions.

11. The computer keyboard of claim 1, wherein the controller is coupled to the first and second optical input devices and configured to assign an input function to the first and second optical input devices from a list of input functions, the input functions comprising a 360 degree cursor navigation, a left-right clicking action, a scroll and zooming action, and a 360 degree cursor navigation with variable cursor speeds.

12. The computer keyboard of claim 1, wherein the controller comprises a software program coupled to a programmable key located on the keyboard.

13. The computer keyboard of claim 1, wherein the first and second optical input devices are coupled with a feedback system configured to provide feedback to a user in order to confirm the activation of the first and second optical input devices during operation, wherein the feedback system includes one of: an audio feedback system; a haptics vibrating mechanism, or a visual cue feedback system.

14. The computer keyboard of claim 1, wherein the first and the second optical input devices are configured to stitch together to provide a single input function that provides cursor navigation over a large area.

15. A computer keyboard, comprising:
a plurality of keys configured to be depressed for generating a character or a sign;
a first optical input device configured to provide a cursor navigation function;
a second optical input device configured to provide input functions comprising a clicking action and a scrolling function;
a navigation engine coupled to the first and second optical input devices configured to report navigation signals in response to finger movement on the first and second optical input devices; and
a plurality of preprogrammed command keys, wherein the plurality of preprogrammed command keys are coupled with the first and second optical input devices, and the plurality of preprogrammed command keys are configured to assign input functions to the first and second optical input devices.

16. The computer keyboard of claim 15, wherein the navigation engine is configured to report a combined navigation signal when the first and second optical input devices are stitched together or report individual navigation signals when the first and second optical input devices are independent.

17. The computer keyboard of claim 15, wherein the navigation engine is configured to read the finger movement over the first and second optical input devices as a single continuous motion.

18. A method of operation for a computer keyboard having a plurality of optical input devices, the method comprising:
assigning a first input function to a first optical input device and a second input function to a second optical input device from a list of input functions;
generating a first navigation signal in response to a finger movement on the first optical input device and a second navigation signal in response to a finger movement on the second optical input device, and
reporting a single navigation signal if the first optical input device and the second optical input device are stitched together or reporting two independent navigation signals if the first optical input device and the second input device are independent.

19. The method of claim 18, further comprising providing a list of input functions for the user to assign to any of the plurality of optical input devices.

20. The method of claim 18, further comprising detecting a pattern generated by a finger movement on one of the plurality of optical input devices and matching the pattern to a predetermined input gesture.

* * * * *